(12) United States Patent
Xiong et al.

(10) Patent No.: US 9,668,309 B1
(45) Date of Patent: May 30, 2017

(54) LED DRIVER PROVIDING CONSTANT OUTPUT POWER ACROSS A WIDE OUTPUT VOLTAGE AND CURRENT RANGE

(71) Applicant: Universal Lighting Technologies, Inc., Madison, AL (US)

(72) Inventors: Wei Xiong, Madison, AL (US); Danny Pugh, Harvest, AL (US); Candice Ungacta, Huntsville, AL (US)

(73) Assignee: Universal Lighting Technologies, Inc., Madison, AL (US)

( * ) Notice: Subject to any disclaimer, the term of this patent is extended or adjusted under 35 U.S.C. 154(b) by 0 days.

(21) Appl. No.: 15/251,314

(22) Filed: Aug. 30, 2016

Related U.S. Application Data

(60) Provisional application No. 62/305,362, filed on Mar. 8, 2016.

(51) Int. Cl.
*H05B 33/08* (2006.01)
*H05B 41/282* (2006.01)

(52) U.S. Cl.
CPC ..... *H05B 33/0815* (2013.01); *H05B 33/0845* (2013.01); *H05B 41/2825* (2013.01)

(58) Field of Classification Search
USPC .... 315/274–282, 209 R, 224, 225, 246, 247, 315/185 S, 291, 307–326
See application file for complete search history.

(56) References Cited

U.S. PATENT DOCUMENTS

2002/0030451 A1\* 3/2002 Moisin ............... H05B 41/2825
315/219

\* cited by examiner

*Primary Examiner* — Tuyet Vo
(74) *Attorney, Agent, or Firm* — Patterson Intellectual Property Law, P.C.; Mark J. Patterson; Gary L. Montle

(57) ABSTRACT

An LED driver provides constant output power with wide range output current and voltage. A parallel resonant tank configuration is supplemented by resonant gain clamping circuit configured to partially cancel voltage across the resonant capacitor during half-bridge switching operation. Voltage between the resonant components is clamped to one-half a driver input voltage, ensuring inductive switching of the half-bridge. An output transformer has a primary winding coupled across the resonant capacitor, with a center tap defining first and second portions. An output voltage clamping circuit is coupled across the DC input power source and to the center tap, wherein maximum voltage across the primary is clamped based on a relationship between respective numbers of turns in the first and second portions, and maximum voltage across a secondary winding is clamped based on a relationship between the respective numbers of turns in the secondary winding and the first and second portions.

19 Claims, 6 Drawing Sheets

LED DRIVER PROVIDING CONSTANT OUTPUT POWER ACROSS A WIDE OUTPUT VOLTAGE AND CURRENT RANGE

CROSS-REFERENCES TO RELATED APPLICATIONS

This application claims benefit of U.S. Provisional Patent Application No. 62/305,362, dated Mar. 8, 2016, and which is hereby incorporated by reference.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to a power supply for lighting devices. More particularly, the present invention relates to an LED (light emitting diode) driver providing constant output power across a wide range of output voltage and output current.

LED power supplies capable of providing constant output power are known in the art and desirable for, among other reasons, their output flexibility. For example, a 210 W constant power LED driver may be designed to drive LED loads ranging from 1.4 A/150V to 0.7 A/300V. The development time may accordingly be drastically reduced, and product consolidation can be maximized.

Referring to FIG. 1, a conventional example of an input stage for an isolated constant power LED driver 10 may be described. An input rail voltage V1 may be provided from a DC source such as for example the output from a power factor correction (PFC) circuit. The rail voltage V1 is provided as the DC voltage input across a half-bridge switching circuit including switching elements Q1 and Q2. A primary resonant tank is connected to a node between the switching elements Q1 and Q2 to receive an output based on a switching frequency thereof, and includes a primary resonant inductor L1 and resonant capacitor C1. A DC blocking capacitor C2 and a primary winding T1$p$ for an output transformer are coupled in series with each other and across the resonant capacitor C1. In the example shown, output clamping diodes D5 and D6 are provided and limit the output voltage across the resonant capacitor C1 to one half of the rail voltage V1.

There are at least two substantial drawbacks to this solution for constant power LED driver design. One such issue is that it is very difficult to optimize the turns ratio for the output transformer for a wide range of output voltage. A related problem is that it is very difficult to optimize the resonant current going through the resonant inductor for a desired wide range of output current and voltage.

Such problems may be illustrated herein by reference again to the example of a 210 W constant power LED driver. To drive a 300V/0.7 A LED load, the turns ratio of the output transformer will have to be at least 1:1.6 to provide the necessary output voltage. In this case, the resonant inductor current ($I_{L1}$) reflected on the primary winding T1$p$ of the output transformer will be the output current (0.7 A)×the turns ratio (1.6)=1.12 A. Assuming the same turns ratio for the LED driver design, but now applying a 150V/1.4 A LED load, the resonant inductor current $I_{L1}$ will be (1.4 A)× (1.6)=2.24 A.

Therefore, the resonant current in the 1.4 A output example is two times higher than that of a 0.7 A load at the same output power level 210 W. This makes the resonant inductor extremely difficult to design, and still further requires the use of switching elements (e.g., MOSFETs Q1 and Q2) with a very high current rating in order to handle the higher end of the current range.

If a dedicated driver is provided for each of 0.7 A and 1.4 A output loads, the output transformer can be optimized so that the resonant current will remain 1.12 A. But optimization of a circuit as shown in FIG. 1 is impossible for constant power and wide-range-output applications because the voltage across the resonant capacitor is clamped.

Referring next to FIG. 2, designers may simply eliminate the clamping diodes (e.g., D5 and D6 from FIG. 1) and optimize the turns ratio of the output transformer for 1.4 A (or the highest output current) to reduce the resonant current. However, the operating frequency for the 0.7 A example will be much higher than is the case when the load is 1.4 A.

As may further be demonstrated in FIG. 3, the frequency difference is primarily a result of the different quality factors (Q) for the resonant tank as corresponding to different LED loads. The natural frequency of the tank is typically high. When the output current is 0.7 A and the output voltage is 300V, the load is: 300V/0.7 A=429 ohms; whereas the load at 1.4 A, 150V is: 150V/1.4 A=107 ohms. As you can see there is four times the difference between load conditions. As a result, the resonant frequency and Q curve will differ greatly with changes in the load. The operating frequency may be very high when the load is 0.7 A, wherein the power converter will conceivably run out of frequency bandwidth in the case where dimming of the LED lighting output is required.

It would therefore be desirable to provide an LED driver circuit for which no large difference was produced on the operating frequency in response to changes in the load at full output, as represented in exemplary fashion in FIG. 4.

It would further be desirable to provide an LED driver circuit for producing a wide range of voltage and current output with constant power driven capability. For example, such an LED driver may desirably enable adjustable output current and output voltage capability across a wide range, for example 1.4 A/150V to 0.7 A, 300V.

It would further be desirable to provide such an LED driver to drive a 210 W lighting array and still further to be dimmable across the lighting range.

It would further be desirable to provide such an LED driver circuit with guaranteed half-bridge soft-switching behavior at all times.

It would further be desirable to provide an LED driver circuit for which no large difference was produced on the resonant current in response to changes in the load.

It would still further be desirable to provide such an LED driver circuit with a self-clamped output.

BRIEF SUMMARY OF THE INVENTION

A proposed LED driver topology in accordance with the present invention will satisfy desired features as listed above.

In one embodiment, an LED driver as disclosed herein is configured for providing output power to a load comprising one or more LEDs. First and second switching elements are coupled in series across a DC power input source. A resonant circuit including a resonant inductor and a resonant capacitor is coupled in series to a node between the first and second switching elements, and a controller is configured to regulate an operating frequency for the first and second switching elements in accordance with a sensed output current through the load and a nominal current value. A resonant gain clamping circuit is coupled between the resonant inductor and the resonant capacitor and is configured to cancel part of a voltage across the resonant capacitor during operation of the first and second switching elements, wherein a constant output power is maintained across an output current range from a first output current value to a second output current value. A primary winding of an output transformer is coupled in parallel with the resonant capacitor.

In one further aspect of an exemplary LED driver as disclosed herein, the resonant gain clamping circuit may be configured to limit a voltage between the resonant inductor and the resonant capacitor to one-half of an input voltage from the DC power input source, and ensure inductive switching operation for the first and second switching elements.

In another aspect of an exemplary LED driver as disclosed herein, a rectifier circuit may be coupled across a secondary winding of the output transformer. An output energy storage device is coupled across the rectifier circuit. First and second output terminals are configured to provide an output voltage from the rectifier circuit and the output energy storage device to the load, wherein the output voltage across the first and second output terminals exceeds a rail input voltage from the DC input power source.

In yet another aspect of an exemplary LED driver as disclosed herein, the primary winding may be formed of a first winding portion and a second winding portion coupled at a third node. An output voltage clamping circuit may be coupled across the DC input power source and to the third node, wherein the output voltage clamping circuit is configured to clamp a maximum voltage across the primary winding to a value based on a relationship between respective numbers of turns in the first and second portions of the primary winding. The output voltage clamping circuit may further be configured to clamp a maximum voltage across the secondary winding to a value based on a relationship between the respective numbers of turns in the secondary winding and the first and second portions of the primary winding.

In yet another aspect of an exemplary LED driver as disclosed herein, the nominal current value may be adjustable by the controller in accordance with an externally provided dimming input signal. The constant output power may be maintained for the nominal current value as between the first output current value and the second output current value.

In still another aspect of an exemplary LED driver as disclosed herein, the second output current value may be 2× the first output current value.

BRIEF DESCRIPTION OF THE SEVERAL
VIEWS OF THE DRAWINGS

Figure 1:
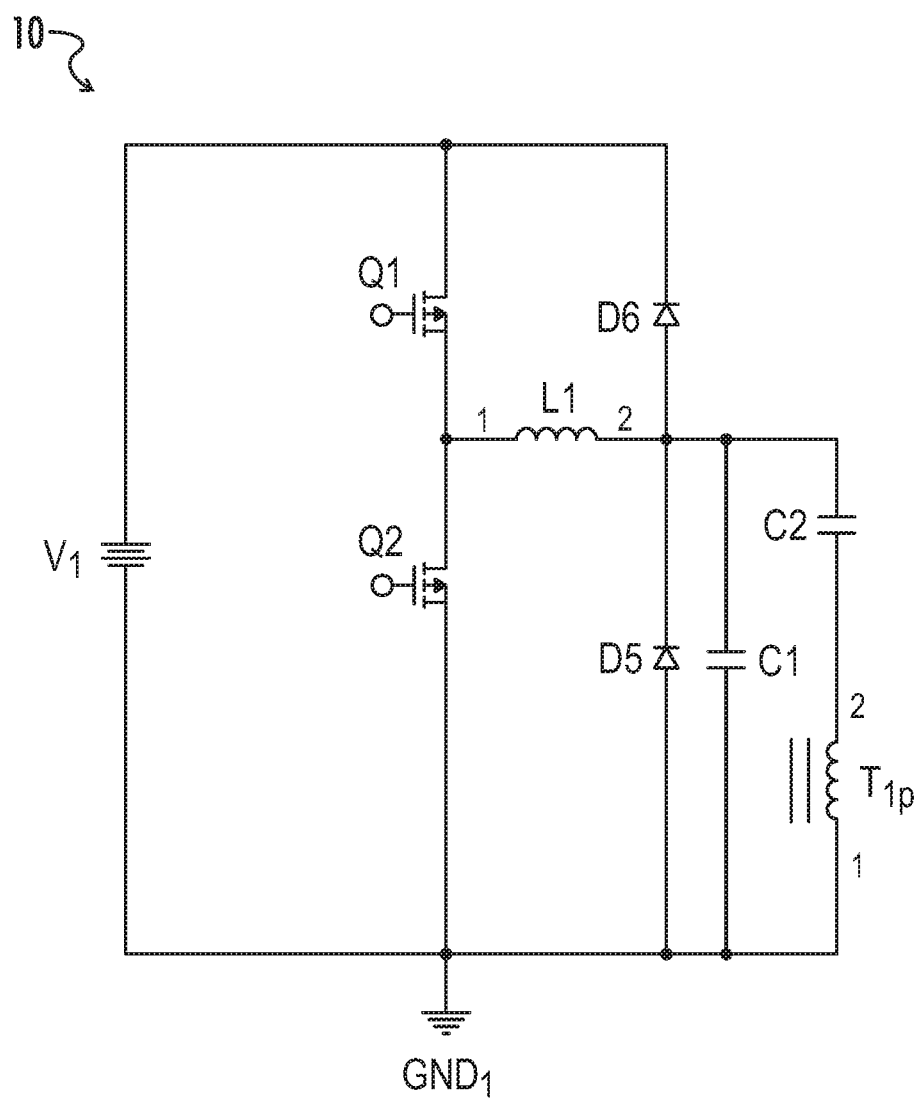
FIG. 1 is a circuit block diagram representing a conventional example of an LED driver circuit.
Figure 2:
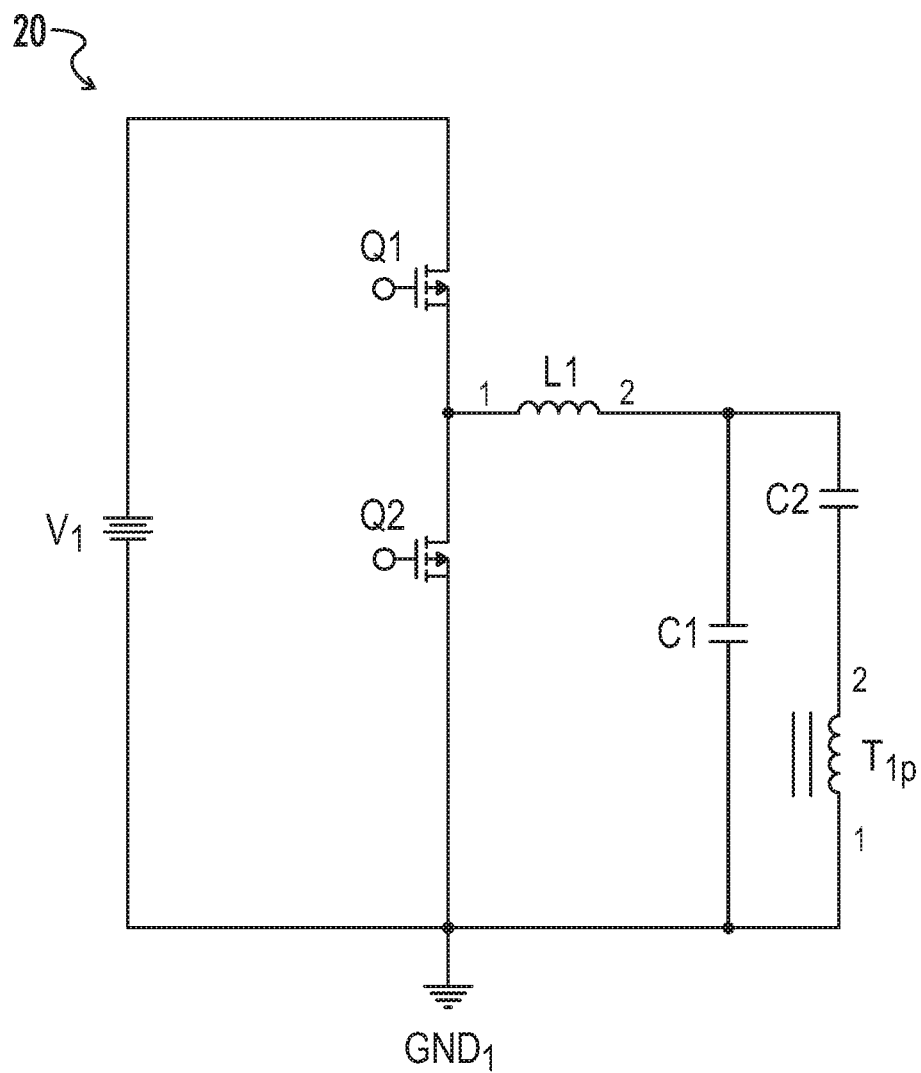
FIG. 2 is a circuit block diagram representing another conventional example of an LED driver circuit.
Figure 3:
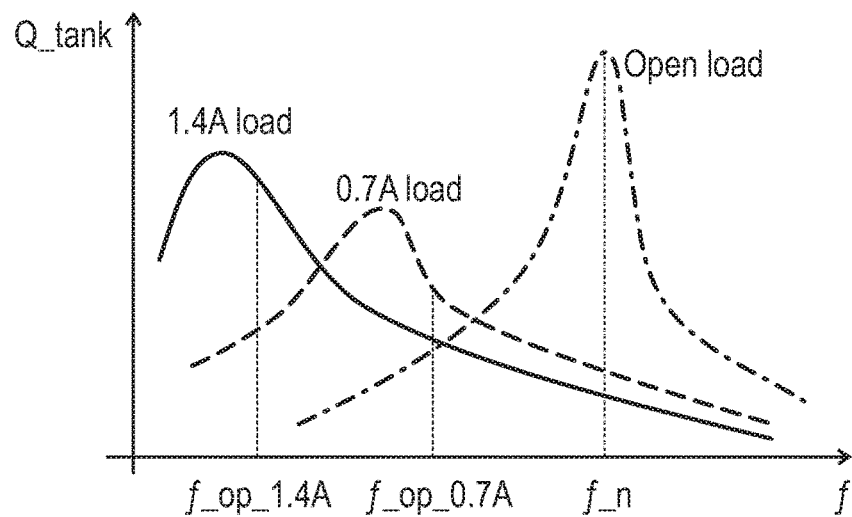
FIG. 3 is a graphical representation of quality factor relative to operating frequency of an LED driver circuit for varying loads.
Figure 4:
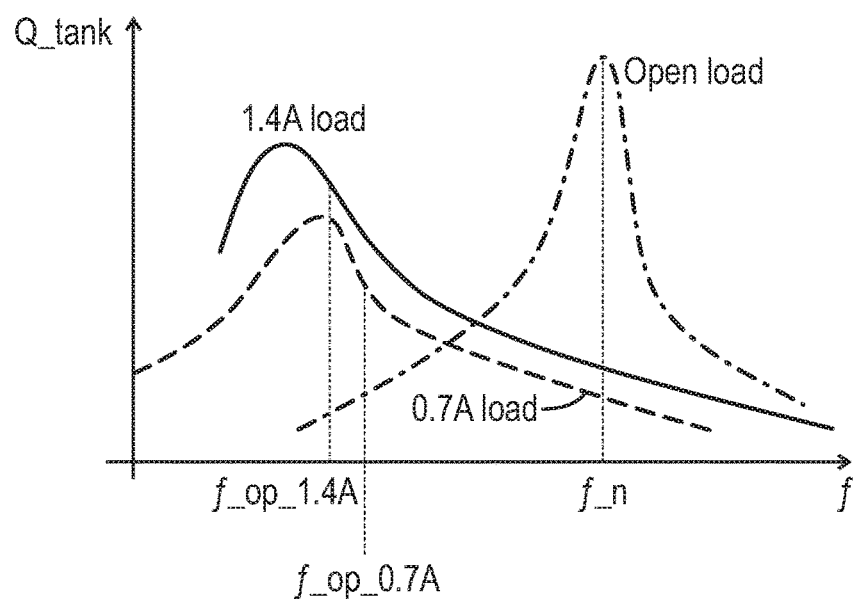
FIG. 4 is a graphical representation of a desired quality factor relative to operating frequency of an LED driver circuit for varying loads.

DETAILED DESCRIPTION OF THE
INVENTION

Referring generally to FIGS. 1-8, various exemplary embodiments of an invention may now be described in detail. Where the various figures may describe embodiments sharing various common elements and features with other embodiments, similar elements and features are given the same reference numerals and redundant description thereof may be omitted below.

Figure 5:
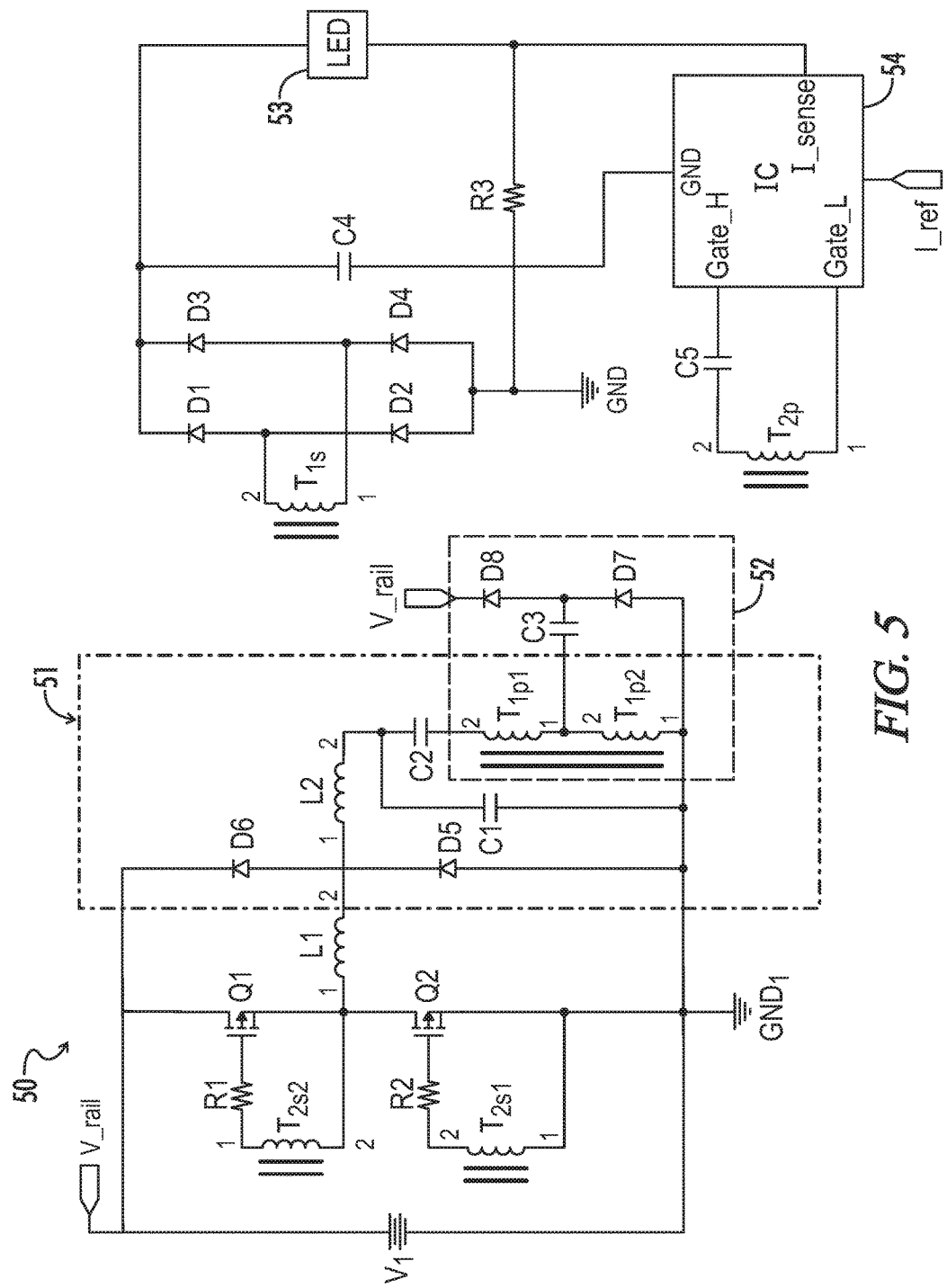
FIG. 5 is a circuit block diagram representing an embodiment of an LED driver circuit as disclosed herein.
Figure 6:
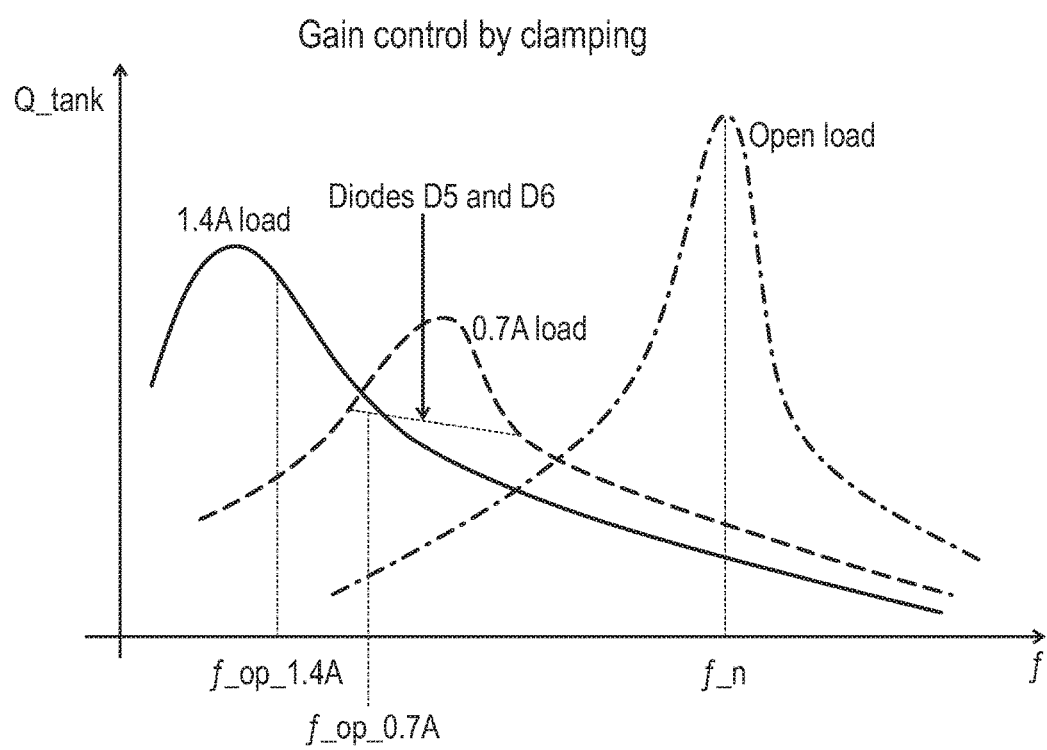
FIG. 6 is a graphical representation of quality factor relative to operating frequency of an embodiment of an LED driver circuit as disclosed herein.

Referring first to FIG. 5, an embodiment of a wide output range LED driver 50 with constant power output capability may be described. An input stage as shown includes a number of components as previously described with respect to FIG. 1, including switching elements Q1, Q2, resonant inductor L1, resonant capacitor C1, and clamping diodes D5, D6. Further provided with the LED driver 50 of FIG. 5 are gate drive resistors R1 and R2 each coupled in series with respective auxiliary windings T2s2 and T2s1 of a gate driver transformer T2p.

An output stage for the LED driver 50 includes a secondary winding T1s of the output transformer which is magnetically coupled to the primary winding T1p and provides the input of a full-wave rectifier diode bridge including diodes D1-D4. An AC voltage of the secondary winding T1s will accordingly be rectified to a DC voltage across a high frequency filter capacitor C4. A load (e.g., LED array) 53 is coupled across the capacitor C4. A current sensing resistor R3 is coupled in series with the load and feeds back the output current information to a controller 54. The controller 54 is configured to control the output current with respect to the set point given by reference current value I_ref, regulating the driven frequency of the half-bridge converter through gate drive transformer T2.

In the embodiment shown in FIG. 5, a tank gain clamping circuit 51 and an output clamping circuit 52 are further added to the input stage. In the tank gain clamping circuit block 51, a second resonant inductor L2 is provided in series with primary winding T1p and DC blocking capacitor C2. Clamping diodes D5 and D6 are coupled together at a node which is further between the first resonant inductor L1 and the second resonant inductor L2, clamping the voltage across L2 and C1.

The second resonant inductor L2 may be characterized as cancelling part of the voltage across the resonant capacitor C1 (inductive voltage cancels the capacitive voltage) so that the voltage across the resonant capacitor C1 can actually exceed one-half of the input voltage (Vrail) from the voltage source V1. As a result, the turns ratio (Ns/Np) of the output transformer T1 can be minimized to reduce the reflected current (from secondary to primary), and the output voltage may further exceed maximum output voltage values as are available in conventional circuits.

To further illustrate this feature, in an example as follows we assume a turns ratio for the output transformer of 1:1, wherein a maximum output voltage of a circuit such as represented in FIG. 1 can only be V_rail. But for an LED driver 50 according to the present disclosure, the maximum output voltage may be much higher because the added resonant inductor L2 cancels part of the voltage on the resonant capacitor C1 in accordance with equations (1, 2) below:

$$V\text{rail}/2 = V\_C1 - V\_L1 \quad (1)$$

$$V\_C1 = V\text{rail}/2 + V\_L1 \quad (2)$$

Therefore, as a direct result of integrating the tank gain clamping circuit 51 a wide range of driver output may be demonstrated with constant power driven capability. The turns ratio of the output transformer may further be optimized for maximum current, wherein changes in the resonant current may be minimized for variances in the load.

The clamping diodes D5 and D6 will also limit the voltage across the resonant inductor L2 and the resonant capacitor C1 when it reaches Vrail/2. Accordingly, and by illustrative reference to the graphical diagram of FIG. 6, the gain of the tank will be substantially flattened out, as a result of which the operating frequencies at different load conditions will be much closer to each other than in embodiments lacking the clamping circuitry (see, e.g., the graphical diagram representing gain (quality factor) with respect to operating frequency in FIG. 3). One potential advantage of such a feature is that the power converter is far less likely to run out of frequency bandwidth in the case where dimming of the LED lighting output is required.

Figure 7:
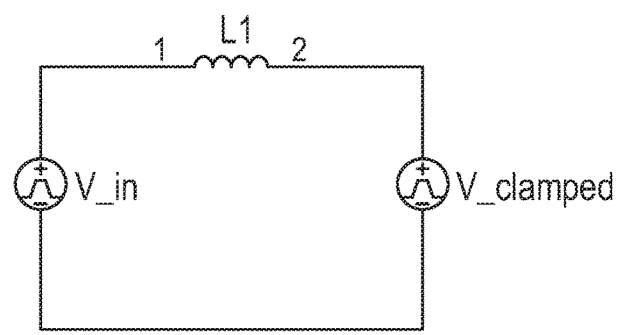
FIG. 7 is an equivalent circuit diagram for a resonant tank according to an embodiment of an LED driver as disclosed herein.

Another aforementioned advantage of the LED driver configuration as provided herein is inherent soft-switching of the half-bridge components. The clamping diodes D5 and D6 prevent the voltage across the resonant inductor L2 and the resonant capacitor C1 from ramping out of control and too high or otherwise beyond circuit specifications. In an embodiment as shown, the voltage after the main resonant inductor L1 for example is always less than Vrail/2. With reference to FIG. 7, an equivalent circuit of the resonant tank may be demonstrated in the case when diodes D5 and D6 are provided for clamping the voltage. If the current through the resonant inductor L1 is defined as:

$$I\_L1 = I^* e^{jA} = I^*(\cos(A) + j^*\sin(A)) \text{ with } -90 < A < 90;$$

and wherein V_in is the reference input with a phase angle=0:

$$V\_\text{clamped} = V\_\text{in}^* I^* e^{j(A-B)} = V\_\text{in}^*(\cos(A-B) + j^*\sin(A-B))$$

Figure 8:
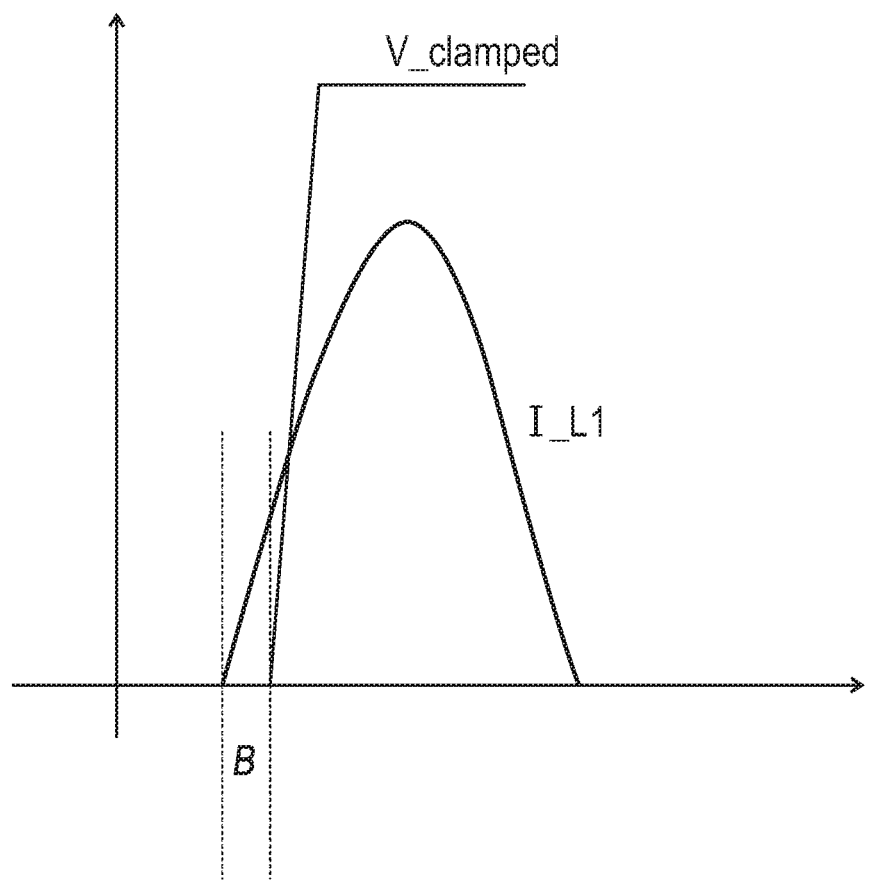
FIG. 8 is a graphical representation of a phase lag between a clamped voltage and resonant inductor current for an embodiment of an LED driver as disclosed herein.

B is a very small positive number, which is the phase lag between V_clamped and I_L1, as shown in FIG. 8. According to Kirchoff's Voltage law, $$V\_\text{in} = j^* wL\_\text{res}^* I\_L\text{res} + V\_\text{clamped};$$

$$= wL\_\text{res}^*(\cos(A+90) + j^*\sin(A+90)) + V\_\text{in}^*(\cos(A-B) + j^*\sin(A-B))$$

The left side of the equation is a real number and does not have any imaginary component, so it follows that:

$$wL\_\text{res}^*\sin(A+90) = -V\_\text{in}^*\sin(A-B)$$

since $-90 < A < 90$, $0 < A < 180$ and $\sin(A+90) > 0$. As a result:

$$-V\_\text{in}^*\sin(A-B) > 0$$

Further upon acknowledging that:

$$\sin(A-B) < 0$$

and taking into account that B is a very small number, it follows that:

$$-90 < A < 0.$$

Accordingly, the phase angle is a negative number, which means that the inductor current I_L1 is always lagging the input voltage of the resonant tank. Thus, the LED driver will always guarantee soft-switching behavior of the half-bridge switch pair Q1, Q2, regardless of any load characteristics and changes in the load.

Referring again to FIG. 5, the output clamping circuit 52 as disclosed herein may further enable embodiments of the LED driver 50 to achieve automatic clamping of the output voltage to the load. The output clamping circuit 52 includes an energy storage device such as for example capacitor C3 connected on a first end to a center tap of the primary winding (yielding a first primary winding portion T1$p$1 and a second primary winding portion T1$p$2 on opposing ends of the center tap) of the output transformer. The capacitor C3 is coupled on a second end to circuit ground GND 1 through a charging diode D7. The total voltage across the capacitor C3 and primary winding portion T1$p$2 is then clamped to the input voltage rail V_rail by another diode D8.

If we provide or otherwise assume the turns ratio between primary winding portion T1$p$2 and the entire primary winding (T1$p$=T1$p$1+T1$p$2) is 1:N, the voltage relationship in the output clamping circuit can be shown as:

$$V\_c\_\text{charge} + V\_\text{To}\_p2 = V\_\text{rail}$$

$$V\_c\_\text{charge} = V\_\text{To}\_p2$$

Accordingly:

$$V\_\text{To}\_p2 = V\_\text{rail}/2$$

$$V\_\text{To}\_p2/V\_\text{To}\_p = 1/N$$

And finally:

$$V\_\text{To}\_p = N^* V\_\text{To}\_p2 = N^* V\_\text{rail}/2$$

Therefore it may be appreciated that the maximum voltage across the primary winding T1$p$ of the output transformer is clamped at N*V_rail/2.

If the turns ratio between the primary windings and the secondary winding of the output transformer is defined as Np:Ns=1:Nps, the maximum voltage at the secondary may be characterized as:

$$V\_\text{To}\_s = N\text{ps}^* N^* V\_\text{rail}/2$$

Therefore it may be further appreciated that the output clamping circuit 52 provides automatic limiting of the output voltage.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "coupled" means at least either a direct electrical connection between the connected items or an indirect connection through one or more passive or active intermediary devices.

The term "circuit" means at least either a single component or a multiplicity of components, either active and/or passive, that are coupled together to provide a desired function.

The terms "switching element" and "switch" may be used interchangeably and may refer herein to at least: a variety of transistors as known in the art (including but not limited to FET, BJT, IGBT, IGFET, etc.), a switching diode, a silicon controlled rectifier (SCR), a diode for alternating current (DIAC), a triode for alternating current (TRIAC), a mechanical single pole/double pole switch (SPDT), or electrical, solid state or reed relays. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

The terms "power converter" and "converter" unless otherwise defined with respect to a particular element may be used interchangeably herein and with reference to at least DC-DC, DC-AC, AC-DC, buck, buck-boost, boost, half-bridge, full-bridge, H-bridge or various other forms of power conversion or inversion as known to one of skill in the art.

The terms "controller," "control circuit" and "control circuitry" as used herein may refer to, be embodied by or otherwise included within a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. A general purpose processor can be a microprocessor, but in the alternative, the processor can be a microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. An LED driver comprising:
    first and second switching elements coupled in series across a DC power input source;
    a first resonant inductive element coupled on a first end to a first node between the first and second switching elements;
    first and second voltage clamping elements coupled in series across the DC power input source, wherein a second end of the first resonant inductive element is coupled to a second node between the first and second voltage clamping elements;
    a second resonant inductive element and a resonant energy storage device coupled in series between the second node and a power input source ground terminal; and
    a primary winding of an output transformer coupled in parallel with the energy storage device, wherein the LED driver further comprising a rectifier circuit coupled across a secondary winding of the output transformer; an output energy storage device coupled across the rectifier circuit; and first and second output terminals configured to provide an output voltage from the rectifier circuit and the output energy storage device to one or more LEDs coupled thereto.

2. The LED driver of claim 1, further comprising a turns ratio of approximately 1:1 for the respective primary and secondary windings of the output transformer,
    wherein the output voltage across the first and second output terminals exceeds a rail input voltage from the DC input power source.

3. The LED driver of claim 2, further comprising a controller configured to regulate an operating frequency for the first and second switching elements in accordance with a sensed output current through the LEDs and a nominal current value,
    wherein a constant output power is maintained across an output current range from a first output current value to a second output current value.

4. The LED driver of claim 3, wherein the nominal current value is adjustable by the controller in accordance with an externally provided dimming input signal, and
    wherein the constant output power is maintained for the nominal current value as between the first output current value and the second output current value.

5. The LED driver of claim 3, wherein the second output current value is 2× the first output current value.

6. The LED driver of claim 3, wherein the primary winding comprises a first winding portion and a second winding portion coupled at a third node, the LED driver further comprising a charging energy storage device coupled on a first end to the third node and on a second end to the power input source ground terminal via a third voltage clamping element.

7. The LED driver of claim 6, wherein the second end of the charging energy storage device is further coupled to a power input source rail terminal via a fourth voltage clamping element.

8. The LED driver of claim 7, wherein a maximum voltage across the primary winding is clamped to a value based on a relationship between respective numbers of turns in the first and second portions of the primary winding.

9. The LED driver of claim 8, further wherein a maximum voltage across the secondary winding is clamped to a value based on a relationship between the respective numbers of turns in the secondary winding and the first and second portions of the primary winding.

10. An LED driver comprising:
first and second switching elements coupled in series across a DC power input source;
a resonant inductive element coupled on a first end to a first node between the first and second switching elements;
first and second voltage clamping elements coupled in series across the DC power input source, wherein a second end of the resonant inductive element is coupled to a second node between the first and second voltage clamping elements;
a resonant energy storage device coupled in series between the second node and a power input source ground terminal;
a primary winding of an output transformer coupled in parallel with the energy storage device and having first and second winding portions coupled at a third node; and
a charging energy storage device coupled on a first end to the third node, and coupled on a second end to the power input source ground terminal via a third voltage clamping element.

11. The LED driver of claim 10, wherein the second end of the charging energy storage device is further coupled to a power input source rail terminal via a fourth voltage clamping element.

12. The LED driver of claim 11, wherein a maximum voltage across the primary winding is clamped to a value based on a relationship between respective numbers of turns in the first and second portions of the primary winding.

13. The LED driver of claim 12, further comprising:
a rectifier circuit coupled across a secondary winding of the output transformer;
an output energy storage device coupled across the rectifier circuit; and
first and second output terminals configured to provide an output voltage from the rectifier circuit and the output energy storage device to one or more LEDs coupled thereto,
wherein a maximum voltage across the secondary winding is clamped to a value based on a relationship between the respective numbers of turns in the secondary winding and the first and second portions of the primary winding.

14. An LED driver for providing output power to a load comprising one or more LEDs, the LED driver comprising:
first and second switching elements coupled in series across a DC power input source;
a resonant circuit comprising a resonant inductor and a resonant capacitor coupled in series to a node between the first and second switching elements;
a controller configured to regulate an operating frequency for the first and second switching elements in accordance with a sensed output current through the load and a nominal current value;
a resonant gain clamping circuit coupled between the resonant inductor and the resonant capacitor and configured to cancel part of a voltage across the resonant capacitor during operation of the first and second switching elements,
wherein a constant output power is maintained across an output current range from a first output current value to a second output current value; and
a primary winding of an output transformer coupled in parallel with the resonant capacitor.

15. The LED driver of claim 14, wherein the resonant gain clamping circuit is configured to limit a voltage between the resonant inductor and the resonant capacitor to one half of an input voltage from the DC power input source, and ensure inductive switching operation for the first and second switching elements.

16. The LED driver of claim 15, further comprising:
a rectifier circuit coupled across a secondary winding of the output transformer;
an output energy storage device coupled across the rectifier circuit;
first and second output terminals configured to provide an output voltage from the rectifier circuit and the output energy storage device to the load,
wherein the output voltage across the first and second output terminals exceeds a rail input voltage from the DC input power source.

17. The LED driver of claim 16, wherein the primary winding comprises a first winding portion and a second winding portion coupled at a third node, the LED driver further comprising:
an output voltage clamping circuit coupled across the DC input power source and to the third node,
wherein the output voltage clamping circuit is configured to
clamp a maximum voltage across the primary winding to a value based on a relationship between respective numbers of turns in the first and second portions of the primary winding, and
clamp a maximum voltage across the secondary winding to a value based on a relationship between the respective numbers of turns in the secondary winding and the first and second portions of the primary winding.

18. The LED driver of claim 17, wherein the nominal current value is adjustable by the controller in accordance with an externally provided dimming input signal, and
wherein the constant output power is maintained for the nominal current value as between the first output current value and the second output current value.

19. The LED driver of claim 18, wherein the second output current value is 2× the first output current value.

* * * * *